Figure 1:
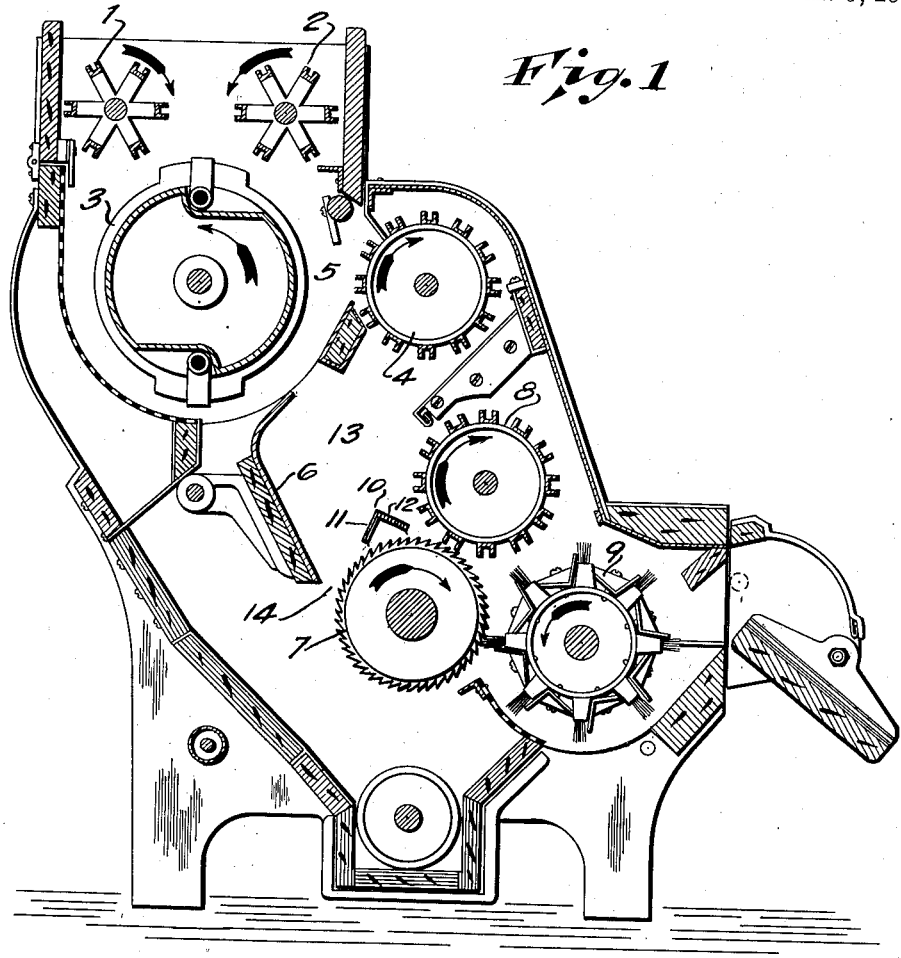

J. E. MITCHELL.
BOLL BREAKING AND COTTON SEPARATING MACHINE.
APPLICATION FILED JAN. 8, 1919.

1,332,911.

Patented Mar. 9, 1920.

INVENTOR
John E. Mitchell

ATTORNEY

UNITED STATES PATENT OFFICE.

JOHN E. MITCHELL, OF ST. LOUIS, MISSOURI.

BOLL-BREAKING AND COTTON-SEPARATING MACHINE.

1,332,911.  Specification of Letters Patent.  Patented Mar. 9, 1920.

Application filed January 8, 1919. Serial No. 270,181.

*To all whom it may concern:*

Be it known that I, JOHN E. MITCHELL, a citizen of the United States, residing in the city of St. Louis and State of Missouri, have invented new and useful Improvements in Boll-Breaking and Cotton-Separating Machines, of which the following is a specification.

This invention relates to improvements in boll breaking and cotton separating machines of the general type shown in various prior patents granted to myself and Dennis Parks. These machines involve in their construction a hull-board for feeding the mixed cotton and hulls to a revolving saw cylinder, and a kicker-roll revolving in proximity thereto and operating to knock back toward the hull-board pieces of hull adhering to the cotton carried up by the saws.

The object of my invention is to provide means located within the working chamber for breaking up bolls or separating hulls, and thus prevent the accumulation in the working chamber of unbroken bolls or unseparated hulls, which are too large to pass through the space between the bottom of the hull-board and the saw cylinder.

As an incident to the use of my improvement, I secure a more or less even distribution or feed of the mixed hulls and cotton between the saw cylinder and kicker roll, and the teeth of the saws on the saw cylinder are caused to more thoroughly and positively engage the cotton and thereby prevent the cotton from becoming knocked back on the hull-board by the kicker roll.

The above object and advantages in operation are attained by the use of a suitable bar, preferably of angle-bar construction, extending the length of the saw cylinder, and mounted a suitable distance above the teeth of the saws, preferably from three-eighths to one-half of an inch, so as to engage the cotton carried by the teeth of the saws underneath the bar, to cause bolls to be broken and hulls to be separated by being forced between said bar and the teeth of the saws, and, by reason of its position between the kicker-roll and the volume of mixed cotton and hulls in the working-chamber, and the fact that all the material to be acted on by the kicker-roll must pass under said bar, prevent large bunches of cotton, or of mixed cotton and hulls being carried to the kicker-roll at one time, or to one part thereof.

In my prior Patent No. 1,129,220, dated February 23, 1915, I illustrate and describe the use of a bar located a considerable distance above the saw cylinder and designed to coöperate with a kicker-roll and a crushing-roll, the latter being located above the bar. This bar was intended to accomplish something of the same purpose as the bar of the present application; and, while it did operate to effect the breaking up of some of the bolls and to separate hulls passing into the working chamber, and thereby delay to some extent the congestion of said chamber after starting the operation, it did not obviate it. The cause of this partial failure is due to the fact that the bar is positioned to coöperate with the kicker roll and crushing roll instead of with the saw cylinder, so that the passage of bolls and unseparated hulls between this bar and the said rolls was not positive, but more or less accidental, depending on the direction in which the said bolls and hulls were knocked upward by contact with the saws. The action, was therefore, slow as compared with the feed of the product to the chamber.

By locating the bar, as shown in my present invention, in proximity to the saw cylinder, I make it necessary for all of the material in the working chamber to pass under said bar before it can reach the kicker roll, and thus provide for the positive and rapid breaking up of all bolls and unseparated hulls that may pass into the working chamber.

It is to be noted, moreover, that the principle of my invention involves a continuous working surface extending throughout the length of the saw cylinder, but at a distance therefrom, so that said surface does not in any manner interfere with the passage between it and the saw cylinder of the cotton seed with the cotton.

The invention is illustrated in the accompanying drawing, in which—

Figure 2:
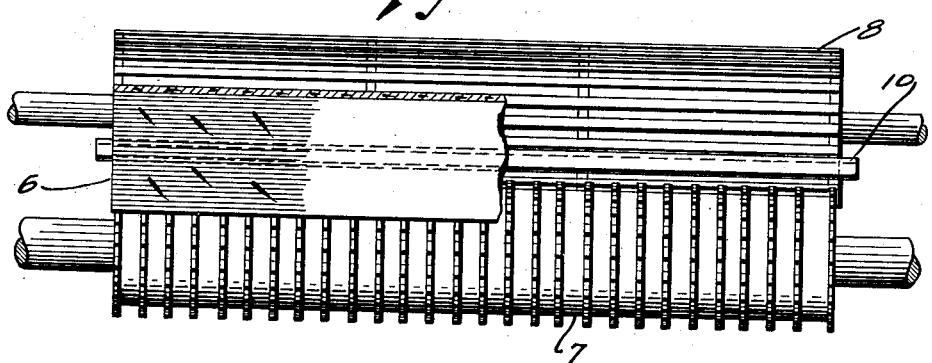

Figure 1 is a cross-sectional view through a machine constructed according to my invention; and Fig. 2 is a view in rear elevation showing the saw-cylinder, the kicker-roll, my improved bar and a portion of the hull-board.

Referring now to the drawing the numerals 1, 2 indicate feed rolls, 3, the boll breaking cylinder, 4 the picker-roll for withdrawing the broken bolls and cotton from the boll-chamber 5, 6 the hull-board, 7 the saw cylinder, 8 the kicker roll and 9 the dofferroll for removing the cotton from the saw cylinder. The operation of these parts is well understood and they do not, as such, enter into the present invention; hence, no detailed description of the same is deemed necessary.

My invention resides in the provision of a bar 10 located above the saw cylinder 7 at a suitable distance from the teeth thereof. This bar is shown to have the form of an angle-bar, having the two members 11 and 12, presenting two separated edges or surfaces located in juxtaposition to the surface of the saw cylinder. This form of bar is preferred, by reason of the double action afforded by its two members, with the resulting high efficiency, and the fact that its inclined surface offers no obstruction to the movement of the pieces of hull knocked back by the saw cylinder.

In operation, the mixed cotton and hulls are discharged into the working chamber 13 and thrown against the hull board 6 by the picker roll 4 and slide into contact with the saw cylinder 7. The teeth of the saws engage the cotton and carry it up beneath the bar 10. The interaction between the bar and said cylinder produces a spreading, or distribution, of the product along the bar, insuring a more even feed thereof between the saw cylinder and the kicker roll. As the cotton passes under the edge of the member 11 of said bar the teeth of the saws will be caused to firmly engage the cotton due to the restricted space through which it must pass, and the retarding of its movement, and as the cotton is carried under the edge of the bar 12 it will again be pressed into firm engagement with the teeth of the saws. Hence, the action of the kicker roll, the surface direction of rotation of which is opposed to that of the saw cylinder, in knocking back pieces of hull carried through by the cotton, will have less tendency, than heretofore obtained in my machines, to knock back pieces of cotton also, by reason of the firm engagement of the cotton with the teeth of the saws caused by the action of the bar 10.

The main function of the bar 10, however, is to cause to be broken up any bolls, or unseparated hulls which may have been carried into the working chamber 13 by the picker roll. Such bolls and unseparated hulls are too large to pass through the discharge space 14 between the lower end of the kicker roll and the saw cylinder and hence tend to accumulate in the working chamber and in the course of time to clog the machine. With my improved bar, however, it is found that such bolls and unseparated hulls will be very rapidly broken up by adhering to the cotton and being drawn, in operation, between the saw cylinder and the bar 10, and particularly the member 11 thereof. This practically obviates any tendency of unbroken bolls and unseparated hulls to accumulate in the working chamber; and I have found that by using my improved bar I can employ a single, in place of a double, hull-board, and that I can adjust the end of the single hull-board 6 sufficiently close to the saw cylinder to prevent the escape of any considerable amount of cotton through the opening 14, without thereby congesting the working chamber, as all bolls and unseparated hulls not sufficiently broken up by the boll breaker 3 will be broken up by being drawn between the bar 10 and the saw cylinder 7, so that the pieces of hull knocked back by the kicker roll 8 into the working chamber will slide down the hull-board 6 and pass out of the chamber through the discharge opening 14.

I claim:—

1. A boll breaking and cotton separating machine, affording a working chamber, means for feeding mixed cotton and hulls to said chamber, a saw cylinder, a kicker roll located above the saw cylinder, said parts coöperating to separate the hulls and cotton so fed to said chamber and a bar extending longitudinally of said saw cylinder in coöperative spaced relation to the surface thereof and located in the crotch between the saw cylinder and the kicker roll.

2. A boll breaking and cotton separating machine, affording a working chamber, means for feeding mixed cotton and hulls to said chamber, a saw cylinder and a kicker roll for separating the hulls and cotton so fed to said chamber, and an angle-bar extending longitudinally of said saw cylinder and in advance of the kicker roll, said bar having its two edges extending parallel with but at a distance from the surface of the saw cylinder.

3. A boll breaking and cotton separating machine affording a working chamber, means for feeding mixed cotton and hulls thereto, a saw cylinder, a kicker roll located above the saw cylinder, said parts coöperating to separate the hulls and cotton so fed to said chamber, and a fixed member extending parallel to the surface of the saw cylinder but at a distance therefrom and located in the crotch between the saw cylinder and the kicker roll, the space between said member and the saw cylinder being such as to prevent the passage of unbroken bolls and unseparated hulls through said space.

In testimony whereof, I have hereunto set my hand.

JOHN E. MITCHELL.